US009017038B2

(12) United States Patent
Pelley et al.

(10) Patent No.: US 9,017,038 B2
(45) Date of Patent: Apr. 28, 2015

(54) VARIABLE PERFORMANCE VANEAXIAL FAN WITH HIGH EFFICIENCY

(75) Inventors: Bryan M. Pelley, Miamisburg, OH (US); Chris D. Hemmelgarn, South Charleston, OH (US); Joseph H. Althaus, Yellow Springs, OH (US); Jennifer M. Fries, Franklin, OH (US)

(73) Assignee: Cornerstone Research Group, Inc., Dayton, OH (US)

( * ) Notice: Subject to any disclaimer, the term of this patent is extended or adjusted under 35 U.S.C. 154(b) by 577 days.

(21) Appl. No.: 13/388,484

(22) PCT Filed: Jun. 9, 2010

(86) PCT No.: PCT/US2010/037972
§ 371 (c)(1), (2), (4) Date: Feb. 2, 2012

(87) PCT Pub. No.: WO2011/019442
PCT Pub. Date: Feb. 17, 2011

(65) Prior Publication Data
US 2012/0128494 A1    May 24, 2012

Related U.S. Application Data

(60) Provisional application No. 61/232,493, filed on Aug. 10, 2009.

(51) Int. Cl.
*F04D 29/46* (2006.01)
*F04D 29/52* (2006.01)
(Continued)

(52) U.S. Cl.
CPC ............. *F04D 29/644* (2013.01); *F04D 29/64* (2013.01); *F04D 19/002* (2013.01); *F04D 27/0261* (2013.01); *F04D 27/002* (2013.01)

(58) Field of Classification Search
CPC ....... F04D 19/02; F04D 29/64; F04D 29/644; F04D 29/646; F01D 7/00
USPC ................. 417/352, 353, 420, 423.7, 423.14; 415/119, 129, 130
See application file for complete search history.

(56) References Cited

U.S. PATENT DOCUMENTS 2,495,433 A * 1/1950 Troller .......................... 416/136
3,561,883 A    2/1971 Berry
(Continued)

OTHER PUBLICATIONS

International Search Report for Application No. PCT/US2010/037972 dated Jul. 29, 2010.
(Continued)

*Primary Examiner* — Peter J Bertheaud
(74) *Attorney, Agent, or Firm* — Dinsmore & Shohl LLP

(57) ABSTRACT

The design of a high efficiency, variable performance vane-axial fan, requires the utilization of typical fan and single stage compressor design methodologies. To be able to replace multiple fans, the variable vaneaxial fan design must be capable of operation at several different flow rates and total pressures. These operation points can be met by varying motor revolutions per minute (RPM) or geometric parameters such as the hub diameter, tip diameter, as well as blade geometry including number of blades, pitch, spacing, and length. An ideal design with variable performance can replace a family of current fan designs by providing the capability for efficient operation over a range of flow rates and total pressures. This level of variability would not only allow the fan to respond to changing environmental conditions but also to be fit into systems with different characteristics.

8 Claims, 7 Drawing Sheets

(51) Int. Cl.
*F04D 29/64* (2006.01)
*F04D 19/00* (2006.01)
*F04D 27/02* (2006.01)
*F04D 27/00* (2006.01)

(56) References Cited

U.S. PATENT DOCUMENTS 3,747,343 A   7/1973   Rosen
4,810,164 A   3/1989   Wright
4,981,414 A * 1/1991   Sheets ........................ 415/149.1
5,666,011 A * 9/1997   Hong ........................... 310/40.5
6,943,475 B2  9/2005   Enomoto et al.
6,991,426 B2  1/2006   Pietricola
8,277,203 B2* 10/2012  Horng ........................... 417/353

OTHER PUBLICATIONS

International Preliminary Report on Patentability for Application PCT/US2010/037972 dated Feb. 23, 2012.

* cited by examiner

VARIABLE PERFORMANCE VANEAXIAL FAN WITH HIGH EFFICIENCY

CROSS REFERENCE TO RELATED APPLICATIONS

This application claims priority from U.S. Provisional Application Ser. No. 61/232,493 filed Aug. 10, 2009.

STATEMENT REGARDING FEDERALLY SPONSORED RESEARCH OR DEVELOPMENT

This invention was made with U.S. Government support under Contract No. N00014-09-M-0091 awarded by the Office of Naval Research to Cornerstone Research Group Inc. The U.S. Government has certain rights in the invention

BACKGROUND OF THE INVENTION

1. Field of the Invention

Vaneaxial fans are axial flow fans which offer high flow rates and total pressures in an in-line configuration. This application discloses a variable vaneaxial fan design which is capable of energy-efficient operation at multiple flow rates and total pressures. The disclosed design accomplishes this by varying motor revolutions per minute (RPM) or geometric parameters such as the hub diameter as well as blade geometry including rotor pitch and stator pitch. In order to optimize each fan design, the length of the blades, the number of blades, and spacing of the blade can be changed in each fan design so as to meet operational requirements.

2. Description of Related Art

Industrial fans and blowers are valuable tools for moving air and materials required in a wide variety of manufacturing processes and industries, including cement, power, mining, coal treatment, pollution control, oil and gas, ethanol and steel. Ranging in size from a few inches to twelve feet or more in diameter, fans are generally categorized into one of three types: centrifugal, axial, or mixed flow. They are used for a myriad of applications, including supplying combustion air for burners, to move dirty air streams, remove particulates from exhaust streams, ventilating mine shafts, blowing coal dust into power plant furnaces, re-circulate process gases, or induce drafts in kilns used to manufacture cement and other materials. Due to the extreme environments in which they are often used, these fans are frequently subject to corrosive chemicals, high temperatures and abrasive air streams. Therefore, for reliable service they must be carefully engineered.

Ventilation systems used in many commercial settings are required, either by code or by functional specifications, to have certain minimum airflow rates based on occupancy, thermal load, or other specifications. For example, in commercial buildings, a minimum level of airflow is required to maintain a healthy air quality within the building based on how many people are in the building. Similarly, in other applications, such as clean rooms, a certain level of airflow must be maintained to allow adequate filtration and removal of airborne particulate.

As used throughout this application fan performance refers to performance at a specific RPM and is tied to system resistance. In order to achieve different performance characteristics it is generally required to alter the fan design.

Air flow rate, total pressure required, and other factors can affect the selection of a particular fan shroud and fan for a specific application. A few additional factors commonly used to select an appropriate fan are the efficiency of the fan, the size of the motor required by the fan and the noise generated by the fan.

Airflow across conventional unducted or axial fans tends to generate turbulence and inefficiencies at the rotor tips. Turbulence is also generated in ducted axial fans at the rotor tips if the spacing between the rotor tips and duct wall exceeds a particular threshold. The increased air turbulence reduces fan efficiency and increases the noise generated by the fan.

Fan rotors housed inside ducts are required for internal flow cases, when air is piped through networks of ducts. Ducted applications require high flow rates to achieve the required heating, cooling, or ventilation. They also require high total pressures due to the resistance generated by the airflow through the duct network. A properly designed fan shroud, or duct, that surrounds the blades of a fan will generally improve the efficiency of the flow of air through the fan. However, the motor size, air flow efficiency, noise generated by the fan, and related factors continue to be problematic in the industry.

By varying the motor RPM of a fan to vary the speed of the rotation of the fan rotor, the flow rate and pressure can be altered within a duct system; however, without altering the geometry of the fan the efficient flow rate and pressure operation points are limited. Varying RPM affects both the flow rate and the total pressure. In cases where system resistance changes due to dampers or other flow control measures or blockages, variable speed alone might not efficiently achieve the flow rate and total pressure required. In the worst case scenario, the changing system resistance can result in an operating point that is beyond the stall threshold for the fan, which can result in damage to the fan and system. Geometrical alterations would need to be made to the fan to expand its operational envelope and to meet all of the desired operating points. A combination of geometrical variations and RPM variations can allow for a broader range of performance to be achieved.

For fixed geometry fans a change in RPM will alter the volume flow within a system while operating at a different total pressure. However, if the RPM is kept constant and the rotor blade pitch is varied, the total pressure can be altered, while the flow rate remains constant to meet changes in system resistance. Therefore, by altering the blade pitch, blade geometry, as well as the motor RPM, a much larger design space can be covered and more operating points can be achieved and this fan would have application in a greater number of systems.

Current fan designs cannot achieve high efficiency at a wide range of pressures and flow rates due to their geometric constraints, rotation speed limitations, and limitations in the efficient operating range of the motors and controllers. As HVAC and ventilation systems are controlled more precisely, fans that work efficiently over a broader range of flow rates and total pressures are necessary. Therefore there is a need for a design of a single fan that can achieve high efficiency across a wide range of pressures and flow rates. In addition, one fan that is versatile and can fit in a range of systems is more cost-effective to manufacture than multiple fans that have more specific operating points.

SUMMARY OF THE INVENTION

The ideal design for a fan with variable performance can replace a family of current vaneaxial fan designs by providing the capability for efficient operation over a range of flow rates and total pressures. This level of variability would not only allow the fan to respond to changing environmental conditions but also be used in systems with different characteristics.

It is an object of the presently disclosed device to provide a vaneaxial fan with variable hub geometry.

It is a further object of the presently disclosed device to provide a vaneaxial fan with variable pitch rotors and stators.

It is a further object of the presently disclosed device to provide a vaneaxial fan with whose rotor and stator geometry will vary from design to design.

It is a further object of the presently disclosed device to provide a vaneaxial fan with a variable motor capable of operating at varying motor rotational speeds, flow rates and total pressures.

DETAILED DESCRIPTION OF EXEMPLARY EMBODIMENTS

Figure 1:
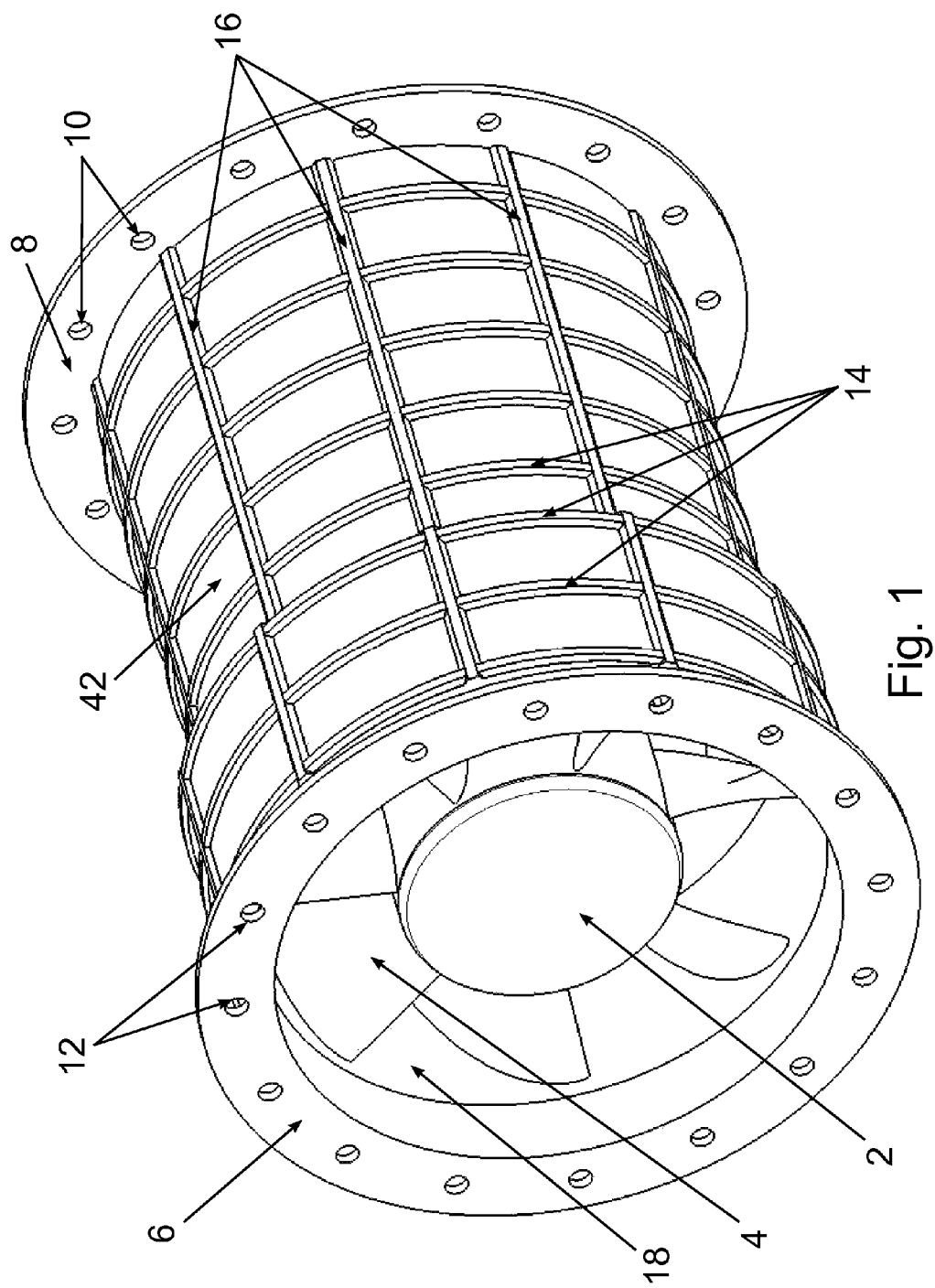
FIG. 1 is a perspective view of a variable fan design wherein the inlet cone has contracted such that it has a small inlet cone diameter.

The design of a high efficiency, variable performance vaneaxial fan requires the utilization of typical fan and single stage compressor design methodologies. To be able to replace multiple fans, the variable vaneaxial fan design must be capable of operation at several different flow rate and total pressures. The disclosed design accomplishes this by varying motor revolutions per minute (RPM) or geometric parameters such as the hub diameter as well as blade geometry including rotor pitch and stator pitch during operation. Additionally the length of the blades, the number of blades, and spacing of the blades can vary for each fan design to meet changing operational requirements.

An ideal design with variable performance can replace a family of current fan designs by providing the capability for efficient operation over a range of flow rates and total pressures. This level of variability would not only allow the fan to respond to changing environmental conditions but also to be fit into systems with different performance requirements.

In order to produce a fan for a given operating range and environment, three main design features need to be taken into account while designing the fan. One design feature is in designing the fan stages, including the rotor and stator, through fan design algorithm development. A second design feature is that the motor, controller, and auxiliary component requirements need to be identified. The selection of these components will depend on the desired operating conditions that each fan will be expected to produce and also meet the mechanical and electrical performance requirements of the system. The third design feature is that the preliminary design of the shroud and structural elements of the system should be defined.

Fan Stage Design

Overview

In the first design feature the fan and fan stages are designed and built. Analysis and research should be used to identify airfoils with high lift to drag (L/D) ratios across a wide range of angles of attack with the necessary requirements to meet the design needs of the fans. By designing the fan blades for maximum efficiency at every radial location of the blade span, providing higher fidelity chord and twist distributions and total hydraulic efficiency estimates, an ideal blade and fan design can be created. A final fan blade design configuration can then be established that offers a unique solution to satisfy project requirements with the torque and RPM characteristics provided to identify motor requirements.

To create a vaneaxial fan with variable performance the airfoil investigation should search for profiles that can maintain high efficiency even as angle of attack between incoming air flow vector and the airfoil chord line would vary due to changing inflow velocity, RPM, or blade pitch. The following symbols are used throughout the application: $C_L$ is the Lift Coefficient; $\beta$ is the Blade Stagger Angle; $\delta$ is the Deviation Angle at Rotor Discharge, L/D is the Ratio of Lift and Drag Coefficients.

Those of skill in this area would be able to create a custom vaneaxial fan analysis and design program that enables rapid evaluation of several design parameters and their effect on the fan efficiency and blade geometry. This program allows a user to quickly assess the design space and identify design configurations that will permit a vaneaxial fan to operate at maximum efficiency over a broad range of performance requirements. This program can also be used to map the blade geometries across the operating ranges to identify similar optimal blade shapes for each target operating point as outlined by the military performance specifications. In doing so, an optimal set of blade geometries could be defined that represent similar twist and chord distributions while operating at an optimally combined set of RPM, flow rate, and total pressure rise to produce maximum efficiencies for each of the operating conditions.

In designing and manufacturing the disclosed device, care should be taken to ensure that the proper airfoil design is selected. By analyzing airfoils across a range of Reynolds Numbers (Re) to identify airfoils that perform better than others throughout the entire range of desired operation, airfoils with superior performance for the given operating parameters can be identified. By focusing on top performers in terms of maximum lift to drag (L/D) ratio, and the span of angle of attack at which high L/D values are maintained, the best airfoils can be determined by those of skill in this art. In addition, for specific fan designs, if the amount and location of maximum camber for the airfoil suggest that there is a potential to develop sufficient values of static pressure rise, high lift coefficients will be required to develop high static pressure where the high lift coefficients indicate a large difference in static pressure distribution between the upper and lower airfoil surfaces. Highly cambered airfoils typically result in high $C_{Lmax}$ values. In these cases the thickness-tochord ratio indicates that a fabricated blade with the profile would probably have sufficient structural integrity to withstand aerodynamic loads and dynamic forces during operation. Therefore, it should be noted that there are a number of important airfoil features to consider during airfoil selection.

There is currently no known commercially available software that can make this analysis so each design team should create software that can perform the desired analysis. The preferred software for doing this is MATLAB for which an iterative design program was developed to analyze fan designs and perform key parametric trade studies. The developed code should be able to iterate through a range of flow rates and RPM values for each design point that satisfy conditional statements, and then select the most efficient designs from each curve representing a given fan geometry, flow rate, and total pressure rise. The ability to quickly design so many fans will allow designers to compare multiple design parameters, focus on key parameters to satisfy project requirements, and establish a unique paradigm for fan design.

It was determined that variable hub diameter, variable rotor geometry, and variable stator geometry could be implemented to deliver the desired range of performance. Diameter as used in this application refers to the specific cross-sectional width of the hub. The diameter may be the same or different at different points in the hub. For example, the hub may have one diameter for one cross-sectional width and a second larger or smaller diameter for a second cross-sectional width at the same or different point on the hub.

In the preferred embodiment the results of the fan development stage show that a variant of the GOE airfoil is a good airfoil choice. The lift coefficient was identified as one of the most limiting factors for extending the range of flow rates and pressures that a given fan design could achieve. For example, values for $C_L$ are typically lower at the blade tips than at the root to generate the same amount of static pressure. With the GOE airfoil L/D performance drops significantly at low or even negative angles of attack that correspond with lower values of $C_L$. This limits the maximum tip speed and flow rate that can be obtained for a given fan diameter.

Fan Stage Theory

To begin the design procedure, fan input parameters including flow rate, total pressure rise, and speed are required. The results from this analysis are used to select a fan design capable of meeting several operational points to allow for a single fan to replace an entire family of fans by in-flight alteration of a design variable such as blade pitch, twist, and hub diameter.

Designing for total pressure provides fan design points that are easier to compare to each other and to current fans. The code developed in MATLAB should be able to analyze the fans but it will not compute fan designs if velocity pressure for the given flow rate and fan geometry exceeds total pressure, which indicates a negative static pressure rise. Conventionally, a single value for each of the input parameters is used for a single fan design point. However, in order to replace an entire family of fans, a range for each of these design variables is necessary. Following determination of specifications, a fan diameter and hub-to-tip ratio is selected. Using these inputs, a fan blade can be designed and efficiency can be determined.

Using the fan specifications determined above, flow velocity and velocity pressure are determined using basic fluid dynamics equations. Once the velocity pressure has been determined, an approximate static pressure rise required to achieve the specified total pressure is calculated. The static pressure rise is used to design the blade geometry. The total head across the fan is calculated using the change in static pressure specified and the calculated axial flow velocity based on the fan diameter specified. The actual total pressure is calculated later to account for losses in the system. Velocity triangles for the rotor blade element are developed at this point to aid in the proceeding analysis for the rotor blade design. Using these diagrams, the blade velocity, inlet flow angle, tangential flow velocity at the blade disk outlet, and the outlet flow angle are calculated. To complete these calculations, the hydraulic efficiency, or the work output into the fluid versus the work input to the fan are analyzed. If the calculated hydraulic efficiency is not equal to the estimated efficiency at each radial location, the analysis will iterate until the margin of error is less than five percent.

These calculations are made at every radial increment defined in the proprietary MATLAB code. Within the radial analysis loop, the values are updated until efficiency is maximized for the defined input parameters. Once the inlet and outlet flow angles are determined, the mean flow angle at each radial location is calculated. The mean flow angle is then used to determine the stagger angle, which is the angle between the chord line and the axis of rotation. This will define the twist for a given design point.

Using the resulting force vectors on the airfoil section, the velocity triangles, and the momentum equation, the force on the fluid due to the moving blade can be expressed in tangential direction and in the axial direction. Without deriving all of these relationships in this section, it is important to realize that there are multiple ways to resolve the critical force vectors. The process employed by the preferred program takes advantage of the relationships that are most readily available from the order of the calculations.

During analysis, many terms are converted into non-dimensional coefficients to maximize the tailorability of the equations to various design scenarios. Blade lift and drag coefficients are related to flow velocity ($\beta$) angles and flow deviation ($\delta$) angles before they are resolved into the tangential and axial forces that contribute to torque and total pressure respectively. The calculation of flow deviation angle is completed for the rotor and stator independently before the efficiency is determined.

Calculating the flow angles and required lift coefficient at each radial location along the blade to maintain a constant pressure rise over the entire span of the blade will result in an optimal twist distribution along the blade length. Iterating radially along the blade span allows for a constant static pressure along the span and thus reduces the tangential-flow velocity distribution along the blade radius from hub-to-tip. Using the general three-dimensional momentum equations for an inviscid fluid and designing the fan to have a free-vortex tangential flow velocity distribution along the radius results in uniform loading and energy transfer along the blade from hub-to-tip. In free vortex flow there is no radial component of velocity. This is obtained by making the total pressure rise and the axial velocity component constant along the radius, which is partially accomplished by tailoring the twist distribution to generate a constant static pressure rise at each radial location. Once the lift coefficient at each radial location has been calculated, an airfoil shape is selected to achieve the desired performance.

During this analysis, the GOE family of airfoils was selected for the blade design because they display high values for lift to drag ratio (L/D) for a variety of blade angles of attack. This allows the L/D to be large at a variety of angles resulting in higher efficiency over a range of blade angles. This key feature of the airfoil results in a fan design that has the potential to remain efficient during off-design performance. On the other hand, the selection of one airfoil limits to some extent the range of performance that can be achieved. Based on the calculated required lift coefficient and the selected airfoil shape, the blade angle of attack can be determined using the airfoil $C_L$ versus $\alpha$ curves.

After designing the blade twist distribution, the total drag coefficient is calculated. The total drag coefficient is composed of profile drag due to the blade shape, annulus drag along the hub and casing surfaces, secondary flow losses, and tip clearance leakage losses. The annulus drag is caused by boundary layer buildup and friction on the walls of the annulus. The secondary flow drag is based on empirical relationships and covers all secondary losses including those related to trailing edge vortices. The tip clearance drag is a result of flow leakage and vortex generation around the blade tips. The total drag coefficient is determined by summing the profile, annulus, secondary, and tip losses.

The current analysis tool determines the profile drag coefficient and the secondary flow loss drag coefficient, and total drag coefficient at each radial location along the blade. Global corrections are made for tip losses and annulus losses.

Once the blade design is completed, the stator vanes are designed to straighten the flow and increase total pressure. The number of stator vanes is based on the number of rotor blades. There should always be more stators than rotor blades so that the stator vanes are closer together, and the number of stators and rotor blades should not have any common factors to avoid operation at resonance. Otherwise, at least two blades would pass at least two vanes simultaneously causing flow pulsation, vibration, and noise. To simplify the design and manufacturing of the initial fan designs the number of stator vanes should be at least one greater than the number of rotor blades and the number of stator vanes and rotor blades should have no common factors.

The stators are designed to turn the flow coming off the rotor blade trailing edge. They redirect radial flow into the axial direction, thus increasing pressure and efficiency. Overall, some velocity is lost across the stators due to drag; however, a portion of the dynamic pressure in the radial direction is recovered as static pressure that would otherwise be lost, and which allows vaneaxial fans to operate at higher total pressures that tubeaxial fans.

Using velocity diagrams, the stator vane inlet flow angle and mean flow angle can be determined. Momentum equations similar to those used to calculate the lift coefficient for the rotor blades in conjunction with the velocity triangles can be used to determine the stator vane lift coefficient required to adequately turn the flow.

Based on the calculated required lift coefficient and the selected airfoil shape, the blade angle of attack can be determined and the corresponding drag coefficient can be calculated similarly to the way they are determined for the rotor blade. The same airfoil for both the rotor and the stator can be used; however, in optimally designed fans different airfoils can be used for the rotor and the stator. The stator is designed in the same incremental radial loop as the rotors. The result is a customized twist distribution for the entire stator.

Once the rotor blade and the stator vanes have been designed the deviation angle is determined for both the rotor and the stator. The deviation angle is calculated as the ratio of drag to lift coefficients of the blade and is used in the efficiency derivation. For an ideal case without drag, the deviation angles for both the rotor and stator are considered to be zero.

Hydraulic Efficiency

The following discussion relates to the calculation of hydraulic efficiency. The total pressure rise across the fan, or fan total pressure, is equivalent to the difference between the total pressure at the fan outlet and the total pressure at the fan inlet. A complete stage in a vaneaxial fan consists of a rotor and a stator, and therefore the fan total pressure is equivalent to the sum of the pressure rise across the rotor and stator control volumes.

The actual hydraulic efficiency across the entire stage, which includes the rotor and stator, can then be calculated by dividing the calculated total pressure rise by the ideal pressure rise.

In the analysis code, if the calculated hydraulic efficiency is not equivalent or nearly equivalent to the estimated efficiency, the process is repeated by iterating on the selected value for efficiency until convergence on efficiency is achieved. The efficiency is calculated due to each radial location and the analysis iterates to achieve the optimum efficiency along the entire blade rather than only at the mean line position.

To determine the specified fan efficiency, and identify parameters for motor selection, the torque, air horsepower, and brake horsepower are calculated. The torque is calculated at each radial location along the blade. The torque at each radial location is summed to determine the entire blade torque, which is then multiplied by the number of blades. The air horsepower and break horsepower are calculated. The air horsepower and break horsepower can be used to calculate the overall efficiency of the fan.

Volume and Pressure Considerations

Choosing a single tip diameter for a fan that will perform over a range of flow rates and total pressure combinations is not an arbitrary task and the implications on total pressure are important. The fan hub and tip diameters drive velocity pressure for a given flow rate because a specific fluid velocity must be realized in order to move the volume of fluid through the annulus area in a given amount of time. The annulus area is defined as the area between the blade tip diameter and the blade hub diameter, or the flow area of the fan. Because velocity must increase as annulus area decreases for a given flow rate, and also because velocity pressure includes a squared axial velocity term, velocity pressure significantly increases as area decreases. Therefore, a reasonable tip diameter and hub-to-tip ratio must be selected for a single fan that replaces a family of fans in order to remain within an acceptable range of total pressures. Both tip diameter and hub-to-tip ratio are important because they both drive annulus area, and the hub-to-tip ratio affects the static pressure rise that is possible for the given flow rate.

Control of flow rate and total pressure has been achieved historically by a fan design with variable RPM and variable blade pitch. The design space can be further expanded if geometric changes are also considered. To satisfy all design conditions for a set fan geometry which is defined as the tip diameter and hub-to-tip ratio, all velocity pressure curves must not cross into the total pressure range. If a velocity pressure curve crosses into the desired total pressure range, than total pressure will be greater than desired because static pressure generated by the fan adds to the velocity pressure. Static pressure rise and hub-to-tip ratio design trades result in another challenge. Essentially, larger static pressures rises are generated more efficiently with larger hub-to-tip ratios. At the low hub-to-tip ratio, high static pressure operation will be inefficient.

Fans with the ability to vary annulus area increase the design envelope. Since outer diameter is usually constrained by the duct work, it makes the most sense to achieve varying annulus area by designing fans with the ability to alter hub diameter. On the other hand, due to the decrease in velocity pressure at lower flow rates and airfoil $C_{Lmax}$, maximum efficiency values drop considerably in some cases. With this in mind, it is evident that there is an optimal range of performance for given tip diameters. Selection of airfoils with different lift slope curves and drag relationships will shift the range of performance, and maximum $C_L$ values will expand or contact the range.

In addition, high hub-to-tip ratios (0.7-0.8) are required for higher pressures rises because the annulus area must decrease to increase velocity pressure. Otherwise, fans with smaller hub diameters struggle to develop sufficient static pressure at radial locations near the root due to lower inflow velocities and $C_L$ limitations.

The increase in RPM for decreasing flow rate is also coupled with decreasing twist. This also illustrates that at the low axial velocities associated with lower flow rates, when the design program attempts to have solutions converge at low speeds, $C_{L_{max}}$ is exceeded, which will then force the code to move on to a higher RPM and lower angle of attack, and therefore lower stagger angle at the root section.

Fan Acoustics

All fans produce noise. However, a number of noise reducing design techniques were inherently integrated into the fan design process. Some of the factors that contribute to noise include the following: Vortex generation, Flow separation, Turbulence; Tip speed; Structural vibrations; and System disturbance, obstructions in air stream.

There are several design factors that effect fan acoustics with the greatest contributor to the noise level being the blade design aerodynamics. Excessive fan noise is usually indicative of some aerodynamic design flaw that causes flow separation, vortex generation, or turbulence. Optimizing the blade design can greatly decrease the fan noise levels; however, there are other causes of noise including structural vibrations, system disturbance, and fan speed.

Vortex shedding caused by turbulent eddies in the wake of the fan blade tips can greatly increase sound levels. Vortex shedding is caused by flow separation from the blade surface and trailing edge and can be controlled and reduced by good blade profile designs with proper pitch angles. Ensuring that rotor blades are properly designed with appropriate twist, chord, and camber with small tip clearances not only decreases noise, but also increases efficiency.

In general, fans are quieter when they operate at peak efficiency. Typically, as system resistance changes, fans are forced to operate off the peak design point, which increases flow losses and vortex generation, reducing the efficiency of the fan system. As a result, increases in noise level occur.

Rotor-stator interactions form a significant source of noise. Air is drawn into and forced through the duct by rotor blades. The rotor blades impart an angular momentum to the flow that is corrected or straightened by the stator blades. The rotor blades also impart a wake into the flow. The wake from the rotor impinges on the stator blade at a frequency dependent on the fan speed and number of rotor blades, causing noise. To combat this, the stators were also radially designed ensuring adequate flow straightening, low drag and minimum flow separation. The number of rotor blades and stator vanes were also carefully selected ensuring that the number of blades were unequal and did not have common factors which could result in a harmonic resonance associated with the number of blades. Lastly, the position of the stator vanes is critical to reducing noise; the stators should be positioned at least ten percent of the fan diameter past the exit from the rotor blades.

To further reduce noise levels, uneven or asymmetric blade spacing can be incorporated into the design. The uneven spacing throws off the harmonics associated with blades evenly spaced passing obstructions such as the stators. When sound passes through evenly spaced rotors, the resonance frequency creates a fan "humming" sound responsible for much of the noise generated by the fans. When the blades are not evenly spaced, the resonance is reduced resulting in lower noise levels.

Fan noise is also a function of the tip speed of the fan. In general, fan noise is proportional to approximately the fifth power of the fan tip speed. As the fan tip speed increases, the fan noise also typically increases.

Structural vibrations can also create noise. These vibrations are typically caused by mechanisms and components within the fan such as bearings and motor mounts. The AFPM drive motors selected for this application have built in bearings, a direct drive configuration, and advanced torque characteristics, which reduces noise. To further reduce noise with fan blade design, notched or serrated leading or trailing edges are incorporated into the blades.

Preferred Fan Design Configuration

The preferred embodiment of the fan design is now discussed. In the preferred embodiment a 13-inch diameter fan with variable hub diameter was identified as the best configuration. The baseline fan design includes the following features: a tip diameter of 13 inches; a flow rate of 2000-5000 CFM; total pressure of 3.5-7 in. WC; seven rotor blades; eight stator blades; a solidity (root/tip) ratio of 1:1; a variable rotor pitch; a variable stator pitch; a variable rotor twist; and a variable hub diameter.

The fan was designed to have an average hydraulic efficiency across the range of performance of 89.44%. The 13-inch diameter fan has the potential to achieve the fifty percent volume reduction compared to existing fans with similar flow rates and total pressures. The curves peak in efficiency between approximately 2200-4400 RPM for all pressure ranges. As pressure increases, peak efficiency shifts towards the higher RPM values. Torque and brake horsepower increase with increasing total pressure. The overall shape of the stagger angle versus radial location curves follow similar distributions between total pressure cases.

The currently presented design incorporates rotors and stators that can pitch within a limited volume and the supporting actuation hardware. In addition, smooth aerodynamic surfaces at transitions between moving and non-moving components were developed. Variable rotors and stators add complexity that most current vaneaxial fans do not incorporate. Of the fans that do have this flexibility, the systems are usually hydraulically actuated and rarely perform pitch changes on-the-fly. The currently presented compact pitch actuation system draws on techniques used in the turbine industry and is less complex than hydraulic systems.

Figure 5:
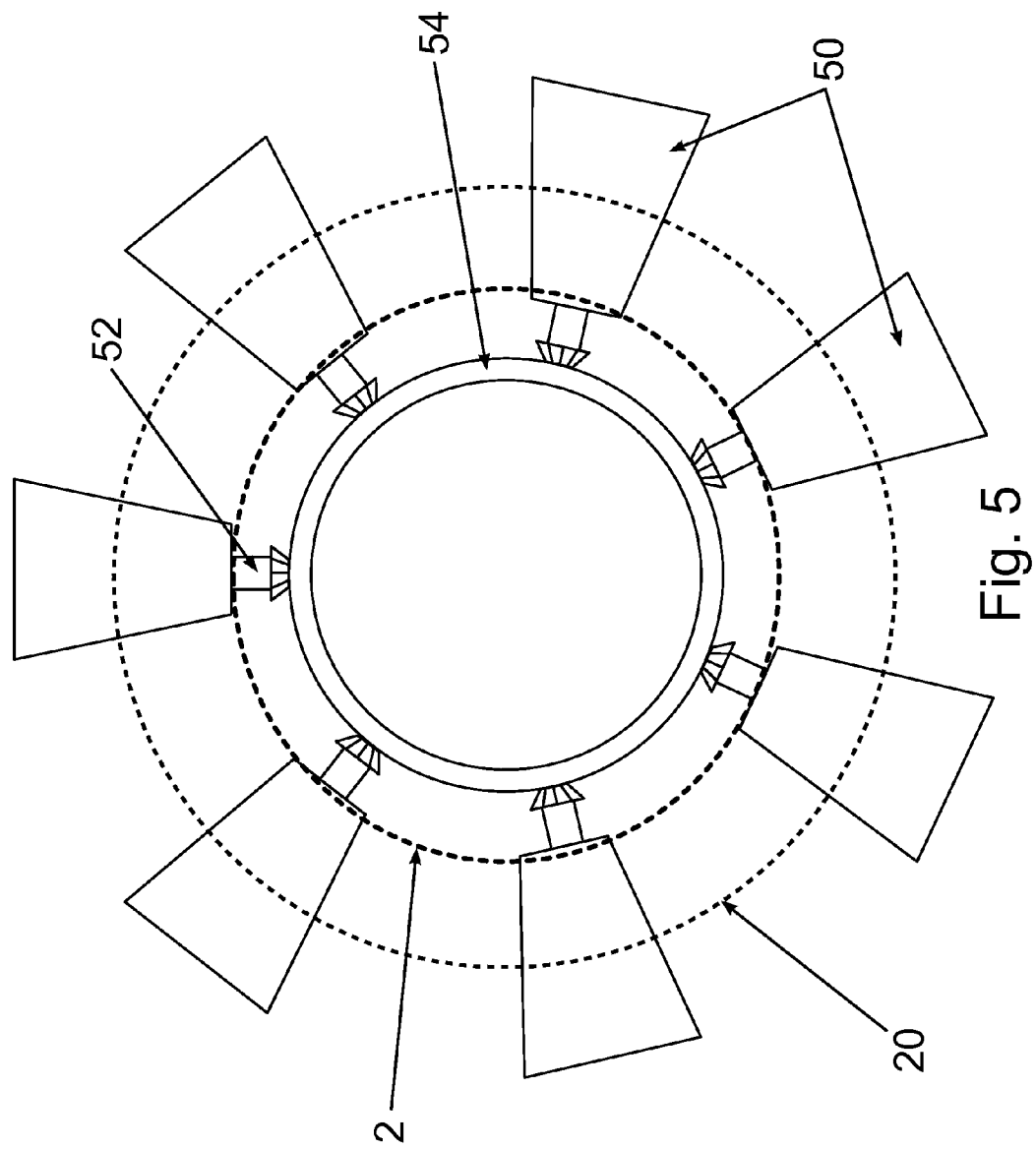
FIG. 5 is a cut away view of the rotor assembly showing how the rotors can have their pitch and angles adjusted.

The current fan design requires variable rotor pitch, on-the-fly. Conventionally, variable rotor pitch has been performed through hydraulic actuation systems. Hydraulic systems are often heavy and complex. Lightweight, compact systems are required to satisfy project requirements. As seen in FIG. 5 the current method for actuating rotor pitch is by interfacing every rotor, 50, with a single ring mechanism, 54, which is similar to blade pitch control techniques on turbine engines. The ring mechanism is rotated by a compact, high torque electric motor or by linear actuators, 52. As shown in FIG. 5, when the fan hub (or in other words inlet cone), 2, is of a small diameter all of the rotor, 50, surface area is exposed. However, when the fan hub (or in other words inlet cone), 20, has a large diameter, less of the rotors are exposed to the air flow.

Figure 6:
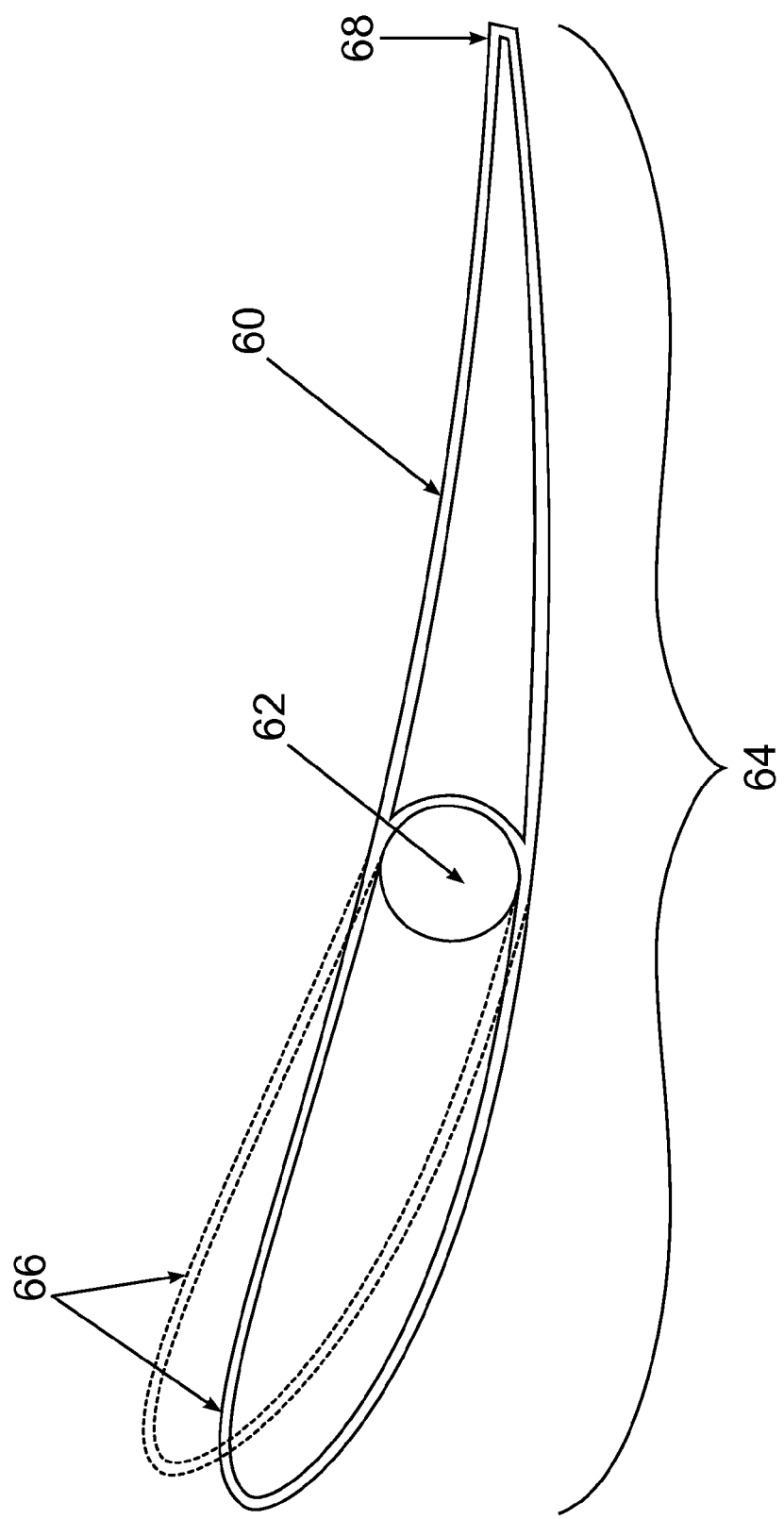
FIG. 6 shows how the stators can have their leading edge adjusted.

The variable rotor pitch requires that the stator must be capable of changing the angle of the leading edge to insure that the flow is adequately straightened by the stator vanes. As seen in FIG. 6, the variable stator leading edge design is much less complex than a variable rotor pitch design as the entire stators do not need to rotate during fan operation. Therefore, a portion of the stator vanes, 64, can remain fixed to the shroud which results in structural benefits and minimizes actuation complexity. The variable stator, 64, incorporates a fixed trailing edge section, 68, with an adjustable leading edge, 66, section. To eliminate any gaps associated with the changing pitch, a continuous skin, 60, or flexible membrane will cover the adaptive stator structure. A rotating means, 62, such as a cam or gear, can be used to modify the adjustable leading edge geometry, 66.

Figure 3:
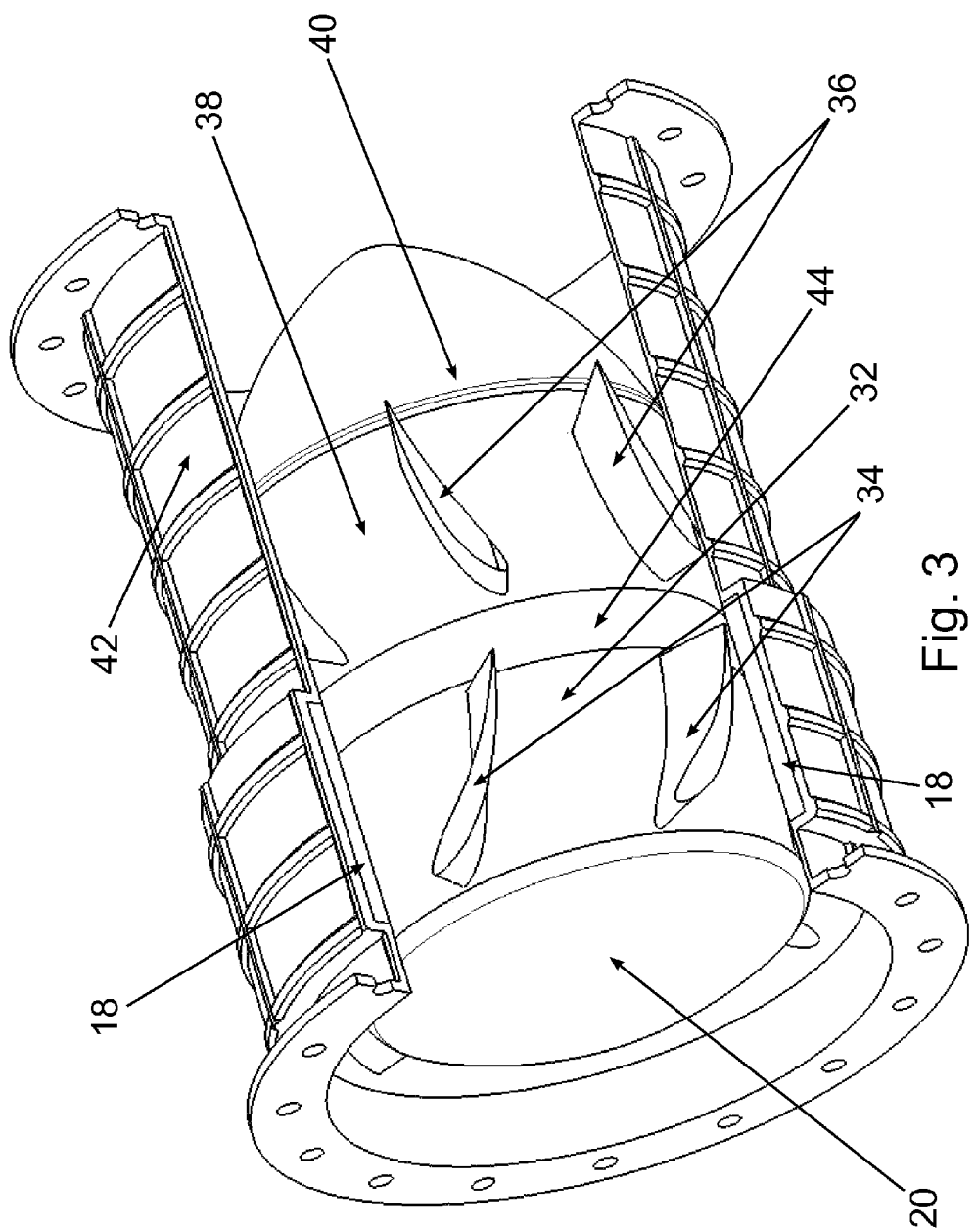
FIG. 3 is a perspective cutout view of the variable fan design of FIG. 1 wherein a portion of the shroud has been removed for illustration purposes only in order to show how the rotors and stators are positioned with respect to one another when the inlet cone has expanded such that it has a large inlet cone diameter.
Figure 4:
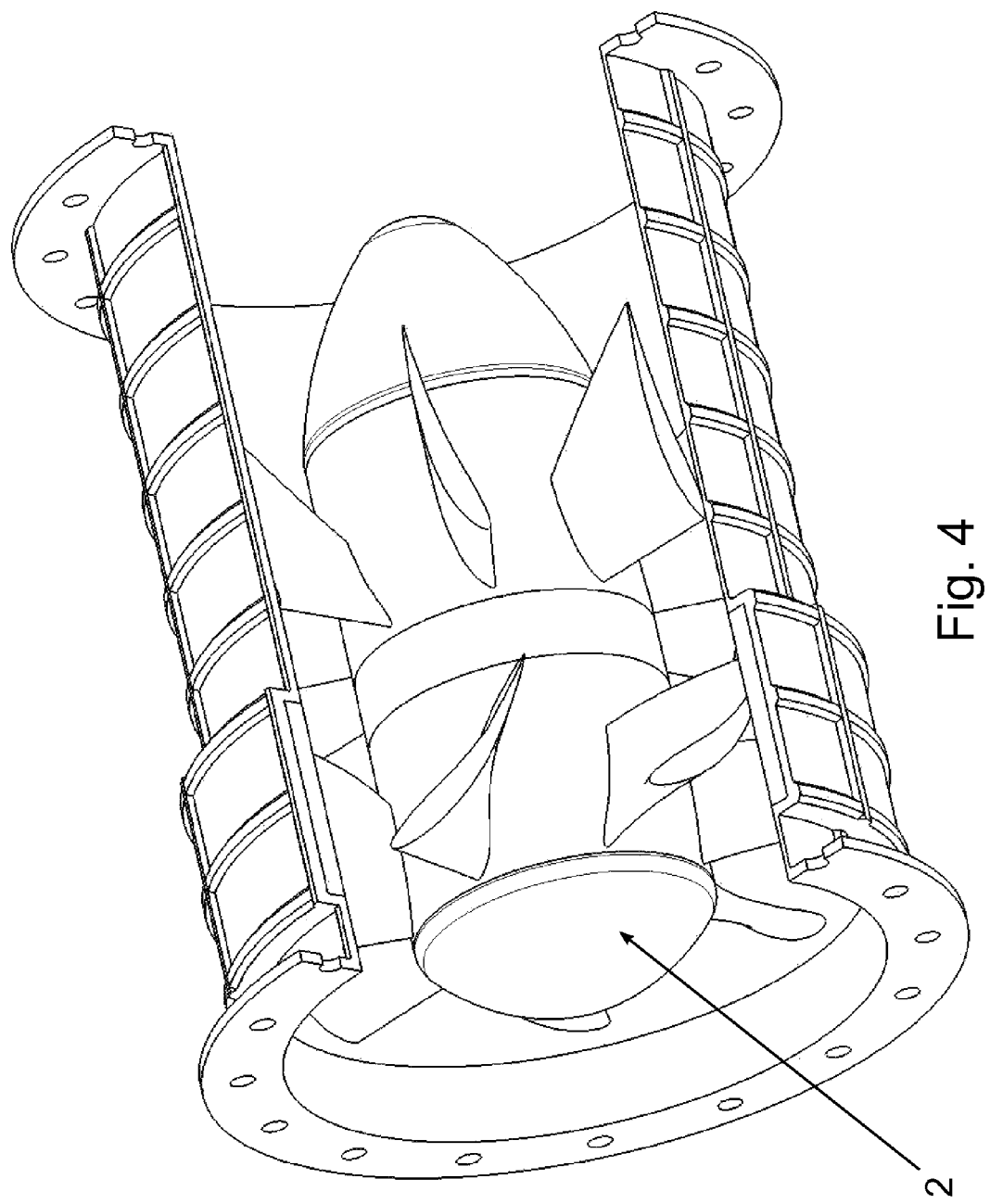
FIG. 4 is a perspective cutout view of the variable fan design of FIG. 1 wherein a portion of the shroud has been removed for illustration purposes only in order to show how the rotors and stators are positioned with respect to one another when the inlet cone has contracted such that is has a small inlet cone diameter.

FIGS. 3 and 4 show the fan shroud, 42, with a cutout through which the acoustic liner, 18, rotors, 34, stators, 36, inlet cone, 2 and 20, and diffuser cone, 40 can be seen. The fan design will transition between multiple blade pitch angles and hub diameters, 2 and 20, as seen in FIGS. 3 and 4 in order to achieve high efficiency at all operating points. The primary components that require actuation include the rotor blades, hub and cone sections, and the stators. Modes of change include rotor pitch change through rotational motion about radial rotor axes, stator leading edge deflection about radial stator axes, and hub and cone diameter change. The rotor hub, 32, motor hub, 44, and stator hub, 38, compete the fan design.

Varying the fan hub diameter greatly expands the performance envelope of a single fan design. The entire range of varying flow rates and total pressure values could not be achieved efficiently with only varying RPM and blade pitch. Therefore, the final fan design includes changing the hub diameter to achieve the full range of performance. One design was inspired by iris diaphragms used in optics. When the outer ring of the iris is rotated, the circle in the center either expands or contracts. An expanding and contracting hub diameter could be achieved by fixing the center point of the iris and applying a rotational moment thus expanding the petals to create a larger diameter.

Another design is a split tube that contracts into itself. The tube is cut longitudinally, and must be flexible enough to be rolled up. This design can be compared to rolling up a newspaper or magazine. As the tube is actuated to unroll, the diameter will expand. This type of actuation could be used to simply expand the diameter of the hub. Flexible skins are necessary to insure that any seams associated with the edges of the split tube do not affect the aerodynamics of the hub.

Lastly, inflatable technologies can be used to control the diameter of the hub. For all expanding hub concepts, novel designs must be employed to allow for the hub to expand over the blades and stators without affecting the airflow across the interfaces between these components. For example, reinforced elastomers positioned within the hub around the rotor and stator blades will allow the hub to expand and contract easily around the blades while maintaining nearly seamless interfaces.

The preferred hub concept in the preferred fan is a reverse optical iris design. The purpose of this design is to create concentric circles of various sizes. These circles are currently made in a step-wise fashion. However, a linear approach can be done with the proper engineering.

To further assist the fan efficiency, partitions spaced radially along the rotor and stator should be built. These partitions will have slots for the iris to expand through and completely block a channel of flow. This is to allow the partitions to channel flow and prevent any form of flow that results in energy losses in the air flow, also know as vortex shed or vortical flow. In the preferred design, these partitions begin just before the rotors and continue, uninterrupted, except for the slots for the iris to expand through, through the stators to the end of the fan.

A prototype fan was designed and fabricated to fit within a standard ducted fan unit for radio controlled aircraft, with the fan performance estimated using the fan design and analysis tools. Testing involved the use of several instruments for measuring the parameters necessary for determining the fan performance in comparison to the values obtained through use of the design code. Louvers placed at the end of the test duct were also used to simulate the system resistance for testing the fan at the designed static pressure and corresponding flow rates.

Motors and Auxiliary Components

During the design of the fan, the motors and auxiliary components needed to make the fan must be chosen. The main point to be considered when choosing motors and auxiliary components is efficiency. Once specific fan requirements are generated based upon the final design discussed above, currently available motor technologies can be selected which will best meet the system design requirements.

Although induction-type motors are common, losses in induction drives are well known, and consist of electrical, magnetic, and mechanical losses. Stator and rotor resistance losses constitute a majority of the electrical losses encountered. By affecting the ratio of these resistances these losses can be optimized. Magnetic losses consist of hysteretic and eddy current losses. These are due to the constant rotation of the magnetic fields that drive the motor. Magnetic losses are addressed during the choice of motor construction materials by affecting permeability and conductivity. Finally, mechanical losses such as friction and windage are due to bearings and drag.

This effort should primarily focus on identifying high efficiency motor and controller technologies that provide the variable torque and speed ranges required to operate the fan rotor configuration. The preferred motor design is one that is at least 93% efficient over the range of RPM and torque at which the fan operates. While modern brushless motors can achieve efficiencies above ninety percent axial flux permanent magnet motors are the only motors identified that can achieve efficiencies at a wide range of RPM and torques in the low to mid ninety percent range. Axial flux permanent magnet (AFPM) motors are preferred for these designs as they have the highest potential to operate at peak efficiency over a wide range of conditions. Other technologies that can satisfy this requirement are radial-flux permanent magnet (RFPM) topologies; switched-reluctance (SR) topologies; and transverse-flux permanent magnet (TFPM) topologies.

Since they are preferred, AFPM motor technologies were integrated due to application-specific superiority for vane-axial fans. The most advantageous feature of the motor is the high efficiency operation over a wide range of torque and RPM. Another distinct advantage of this technology is the flexibility in the sizing of the motors, which enables the optimization of the motor for the specific operating range. These technologies offer superior performance in terms of efficiency and power density when compared to AC-induction technologies. Moreover, these technologies are adept candidates for efficient variable speed operation as opposed to traditional motor technologies.

There are several functional and operational criteria for the motor design which are: ability to maintain high efficiencies over wide range of RPM; achieve high power and torque densities; enable direct drive configuration and possess the correct size to fit within fan volume; reduce acoustic signature; operate with appropriate power input; provide financially viable alternatives to current systems; Peak operating conditions; Power conditioning requirements; Position and temperature feedback requirements; Mechanical tolerances; Mounting strategies; Effective cooling strategies; and Ingress protection.

Figure 7:
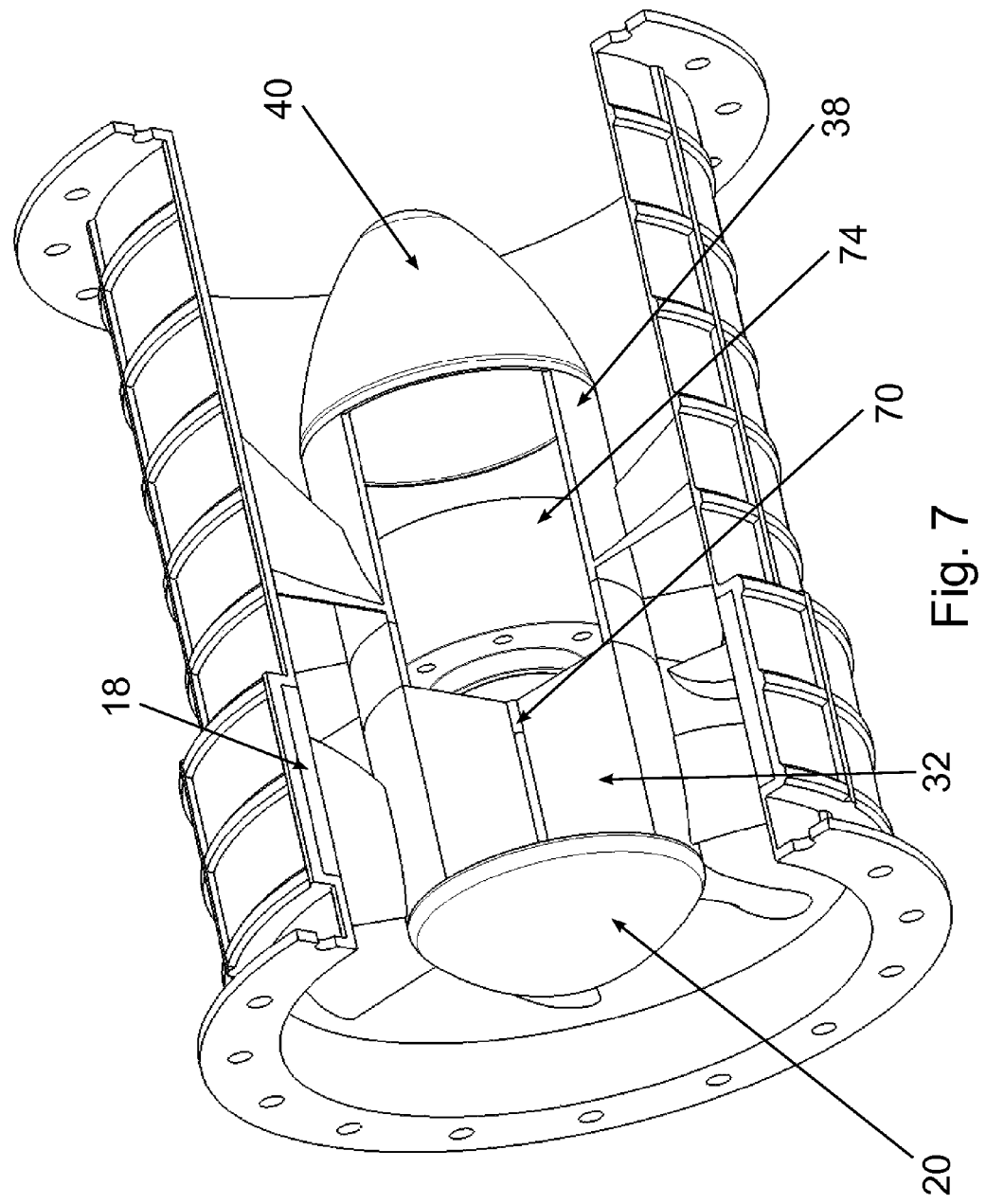
FIG. 7 is a perspective cutout view showing the motor assembly.

AFPM technologies can be implemented with various combinations of configuration and control strategy. Methods of controlling AFPM motors include standard and modified PWM operation (a.k.a square-wave or trapezoidal operation, brushless DC operation) and Sinusoidal PWM operation (a.k.a sine-wave operation, brushless AC operation). Sinusoidal PWM provides very high efficiency control of the motor, provides the power to the motor in a manner that allows the motor to operate and its peak efficiency. Other operational benefits of employing the sinusoidal PWM method include desirable torque characteristics and reductions in audible noise. As seen in FIG. 7 the rotor shaft, 70, and the rotor hub, 74, are shown in a cutaway.

The desired operational envelope for the preferred fan is with a 13-inch vaneaxial fan designed for flow rates between 2000-5000 FLOW RATE and total pressures between 3.5-7 in. WC, within which the direct drive motor needs to function to achieve the system design requirements. The RPM and torque ranges that the preferred motor needs to achieve while maintaining levels of efficiency greater than ninety-four percent while producing flow rates between 2000-5000 RPM and total pressure between 3.5-7 in. WC range from 2400 RPM with 2.8 ft-lb of torque to 4200 RPM and 8.1 ft-lb of torque to 4400 RPM and 3.0 ft-lb of torque.

Using AFPM motors to drive the fan disk is preferred. The choice of AFPM motor design should satisfy the operating range and because of their short length it can be safely assumed that the length of the vaneaxial fan designs will also decrease. Reducing fan length is an important goal to realize the volume reduction goals across the entire family of fans. Again, however, a balance must be achieved between volume reduction for all fans and total pressure.

Shroud Configuration and Fan Fabrication

Once the fan design and motors are selected, the shroud design and fabrication method must be finalized. The design of the shroud should satisfy fan aerodynamic, efficiency, acoustics, and structural requirements. The fan shroud, which is also referred to as the duct or case, influences fan operating parameters and contributes to the survivability of the unit.

Fan casing parameters such as tolerance, surface roughness, and tip clearance all influence the power required to move air through the system. The fan shroud is designed to minimize losses associated with skin friction on the shroud walls as well as blade tip vortex generation. One goal of the shroud is to reduce the surface roughness and therefore skin friction as much as possible. Material selection affects the skin friction. Additionally, the shroud dimensions have tight tolerances to ensure that tip clearances are kept to a minimum to reduce losses due to tip vortices. Porous acoustic liners are incorporated into the shroud design to not only reduce sound but also to reduce tip clearances, as the liner can be worn away by the rotating blades. The acoustic liner also provides a structural benefit. In the event that the duct walls deflect inward during operation due to pressure differentials, instead of striking the hard shroud material, the blades will contact the soft acoustic liner, reducing the chance of damaging the blade tips.

The fan shroud is designed to contribute to efficiency requirements of the fan system but also to have high strength, high stiffness, and low weight. During fan operation, pressure differentials and high torques result in large loading to the fan shroud. To increase the strength and stiffness of the shroud, external structural stiffeners in the form of stringers and circular frame members are incorporated into the shroud design.

The circular frame members are designed to resist out-of-plane loading and duct buckling. The number, size, and cross-sectional shape of these members are determined through detailed structural analysis and are adequately sized to withstand the expected loading generated by the operational fan.

As shown in FIG. 1, the preferred embodiment main duct structure, 42, or shroud panel incorporates stiffeners or stringers, 16, as well as frames, 14. The thickness of the duct wall as well as the material selection are determined by fan loading and fabrication and cost limitations. Candidate stiffener and stringer shapes are evaluated along with the size and number of stringers required to determine the best combination of mechanical properties, cost, and weight.

Figure 2:
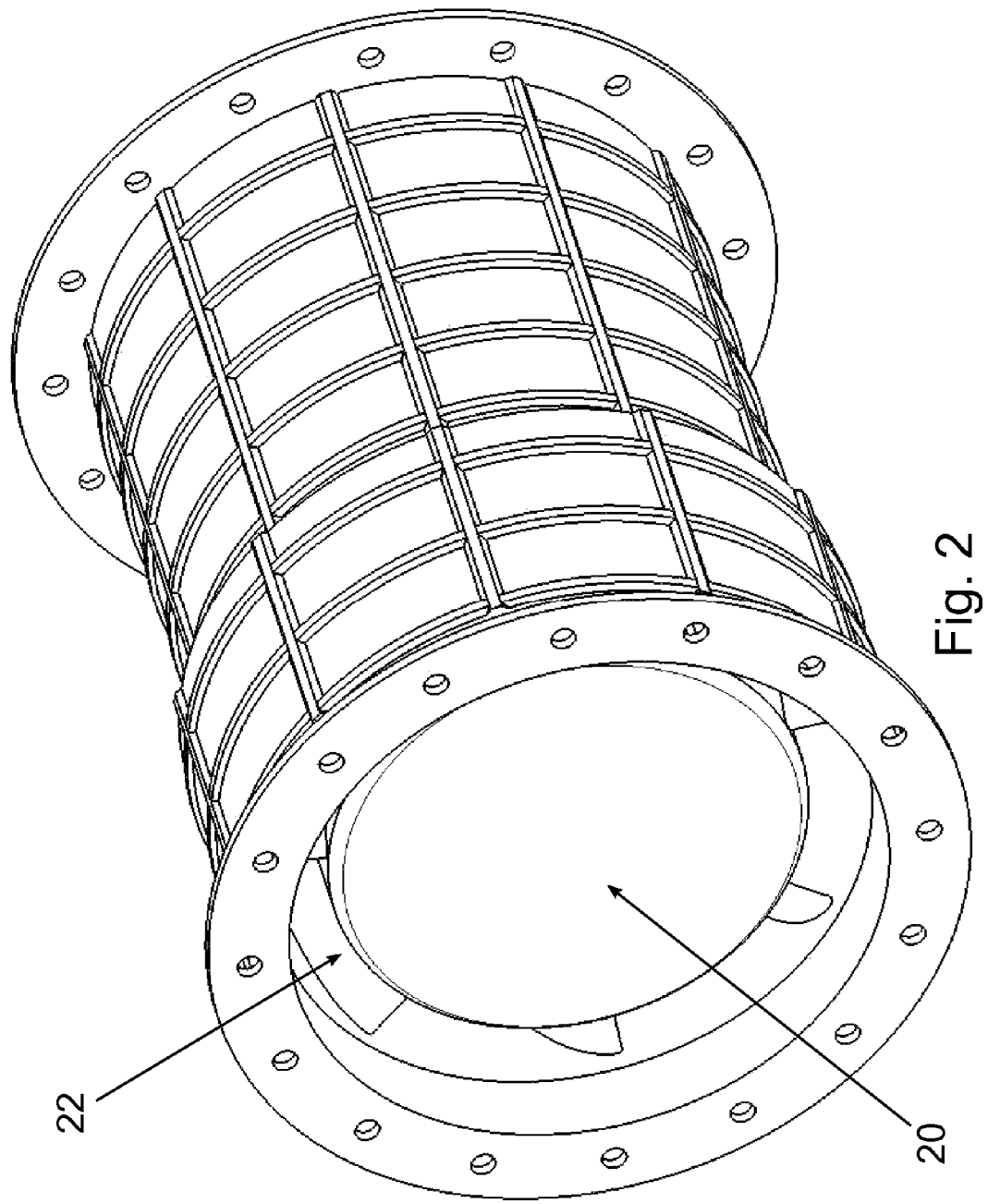
FIG. 2 is a perspective view of the variable fan design of FIG. 1 wherein the inlet cone has expanded such that it has a large inlet cone diameter.

To allow for ease of retrofitting into current systems and also for attachment of duct work, diffuser, or inlet features, an inlet flange, 6, and an outlet flange, 8, and attachment holes, 10 and 12, are incorporated to the front and back of the fan shroud. For a 13-inch duct diameter, a flange having a diameter of approximately 16-inch and incorporate an array of bolt holes for attachment is required. The acoustic liner, 18, and rotors, 4, are also shown in FIG. 1. The inlet cone, 2, can vary in size as shown in FIG. 1 where it has a small diameter, and in FIG. 2, where the inlet cone, 20, has a larger diameter, effectively making the rotors, 22, smaller.

Effective fan and motor design results in the capability to achieve high system efficiencies; however, appropriate fabrication techniques are required to ensure that the designed efficiencies, target weight values, reliability parameters, and even acoustic requirements are achieved. The following list highlights common challenges and overlooked features between fan design and manufacturing: achieving high tolerances; achieving smooth aerodynamic surfaces; solving material compatibility problems; compensating for operational dust buildup on fan surfaces; building in excess material for balancing; and avoiding vibration/resonance conditions.

Potential fabrication processes were identified to produce metal, composite or plastic parts. Each method has advantages and disadvantages. For example, tolerance and surface quality are shortcomings for die cast metal components, while part strength is a benefit. Metal CNC machining results in high tolerances and surface quality, but is expensive. Composites typically suffer from high cost, however their lightweight allows for the design of complex parts and high strength are benefits. Plastic parts can be fabricated with high precision at low cost; however, their lack of strength is a shortcoming.

Rotor blade fabrication is critical to the success of the fan design. Geometric tolerances and smooth surfaces are key to aerodynamic efficiency, while strength and balance are key to reliable operation. Metal die casting is commonly used to fabricate fan blades; however, without significant post processing tolerances and surface quality suffers. In addition, the weight is high for metal parts, which adds inertia and increases power requirements. Metal CNC machining offers higher tolerance and surface quality but is expensive. Composite fabrication and plastic injection molding processes scored the highest in the decision matrix for rotor fabrication. Conventional composite fabrication methods are labor intensive and therefore expensive; however, using novel approaches such as Smart Mandrels or the foam expansion technique can significantly reduce cost. The potential for variability in part weight exists due to the fact that a larger number of factors must be controlled in composite fabrication, so designing in extra material for later removal to better balance the blades is important. Composite strength is high, and surface quality is maintained with high quality molds.

Composite flammability and resistance to ocean spray are properties that are addressed based on the materials the blades are made of.

Plastic injection molding is another fabrication solution that has recently gained attention in the fan industry. Many axial fans are already injection molded for cooling computers and electronics, and the use of plastic fan blades has spread to the automotive industry, home ventilation, and even room air purification units. Injection molding thermoplastics can be very inexpensive. The highest cost is associated with mold fabrication. Surface quality and tolerances are excellent if quality molds are fabricated and if proper mold flow analysis is performed (Improperly gated molds can result in part warp, especially when fiber fillers are used for added strength). Plastic fans can be molded in balance or nearly in balance, reducing post-processing requirements. Many plastics are corrosion resistant, and because they are softer than steels and have different damping coefficients, they often result in less noise and vibration. On the other hand, they suffer compared to composites and metals in structural strength.

Thermoplastics are often reinforced with glass fiber for increased strength. Some plastics such as Ultem® offer a combination of high strength, high temperature capabilities, lower moisture absorption, and low flammability, making them well suited for the vaneaxial fan application. Ultem® plastics can be found filled with glass or carbon reinforcement, they operate continuously at 340° F., and have excellent flammability and chemical resistance. Using the results of fan blade design, high efficiency should be achievable across a range of performance by varying blade pitch and hub diameter.

Where blade twist must be varied to achieve the performance range, plastics are top candidates. Plastic blades can be supported at each end, and then actuated asymmetrically to vary the blade twist distribution within the linear elastic range of the stress strain curve. The twisting motion can be achieved to a lesser extent with composites, but is not feasible with metals.

Composite fabrication and plastic injection molding are also promising methods for fan duct or casing components, and inlet and diffuser cones. While strength is a concern, structural features such as stringers and frames, common for aerospace structures, can be integrated to increase stiffness, reduce flexture, and enhance impact loading survivability of these materials. In addition, reinforcements used for composite fabrication can contain fan blades in the event that a catastrophic blade failure occurs (jet engine nacelles usually include layers of wrapped Kevlar® to prevent severed blades from exiting nacelle walls). Coupled with the fifty percent reduction in fan volume, the materials should easily achieve the goals for fifty percent reduction in system weight as well. Mandrels are an excellent option for duct fabrication, since they lend well to complex structural features and produce high strength composites at reasonable cost.

Each of these methods can be used to create the parts needed to make the complete fan system. These parts must be compatible with each other and be able to withstand the operating environment. For example, the actuation systems will include CNC-machined aluminum and stainless steel components for strength and durability. Likewise, machined gears or cams will need to attach at blade roots to interface with the actuation system. However, the rotors, stators, and shroud may be composite parts.

As will be clear to those of skill in the art, the herein described embodiments of the present invention may be altered in various ways without departing from the scope or teaching of the present invention. It is the following claims, including all equivalents, which define the scope of the present invention.

What is claimed is:

1. A fan system comprising:
   a fan shroud comprising an airflow inlet and airflow outlet;
   a rotor shaft extending along a fan axis defined between the airflow inlet and airflow outlet;
   a fan hub coaxially disposed within the fan shroud and comprising a rotor hub and a stator hub downstream of the rotor hub;
   at least one rotor blade extending through the rotor hub; and
   at least one stator vane extending through the stator hub, wherein the at least one stator vane comprises a fixed trailing edge, an adjustable leading edge, and a rotating mechanism disposed proximate a central position along a length of the at least one stator vane between the fixed trailing edge and the adjustable leading edge,
   wherein actuation of the rotating mechanism is configured to trigger the rotation of the at least one stator vane such that said at least one stator vane pivots from said central position, thereby moving said adjustable leading edge, while said fixed trailing edge remains stationary.

2. The fan system of claim 1 further comprising a flexible skin layer disposed over the at least one stator vane, wherein the flexible skin layer comprises an elastomer.

3. The fan system of claim 1 further comprising a permanent magnet motor drivingly coupled to the rotor shaft.

4. The fan system of claim 3 wherein the permanent magnet motor is an axial flux permanent magnet motor.

5. The fan system of claim 3 further comprising a sinusoidal pulse width modulation control system configured to control the permanent magnet motor.

6. The fan system of claim 1 further comprising a rotatable ring mechanism disposed within the rotor hub, a plurality of linear actuators that couple the rotatable ring mechanism with the rotor blades, and a motor configured to rotate the rotatable ring mechanism and the linear actuators and rotor blades attached thereto.

7. The fan system of claim 1 wherein the rotating mechanism is a cam.

8. The fan system of claim 1 wherein the fan hub further comprises an inlet cone disposed upstream of the rotor hub, a diffuser cone disposed downstream of the stator hub, or combinations thereof.

* * * * *